United States Patent [19]

Sawada et al.

[11] Patent Number: 5,005,810
[45] Date of Patent: Apr. 9, 1991

[54] FLUID-FILLED CUSHIONING DEVICE HAVING SEALING ARRANGEMENT FOR EASY ASSEMBLING

[75] Inventors: Kouji Sawada, Toyota; Yasuhiro Miya, Kakogawa; Masato Tanabe, Toyota; Takanobu Nanno, Kasugai; Shinji Miyakawa, Komaki, all of Japan

[73] Assignees: Tokai Rubber Ind., Ltd.; Toyota Jidosha Kabushiki Kaisha, both of Japan

[21] Appl. No.: 215,305

[22] Filed: Jul. 5, 1988

[30] Foreign Application Priority Data

Jul. 9, 1987 [JP] Japan ............... 62-171665
Jul. 28, 1987 [JP] Japan ............... 62-115625

[51] Int. Cl.⁵ .................................................. F16F 9/14
[52] U.S. Cl. ........................... 267/140.1; 180/312;
 248/532; 248/636; 267/219; 277/169
[58] Field of Search ................ 180/300, 312, 902;
 248/636, 562; 267/120, 136, 140.1, 140.2, 140.5,
 141, 141.2, 141.3, 141.7, 141.5, 293, 195, 217,
 219, 225; 270/80, 465, 378; 277/168, 169, 170

[56] References Cited

U.S. PATENT DOCUMENTS

| | | | |
|---|---|---|---|
| 2,562,195 | 7/1951 | Lee ......................... | 267/140.1 |
| 2,657,807 | 11/1953 | Launder .................. | 270/378 X |
| 2,817,557 | 12/1957 | Reynold ................... | 180/312 X |
| 4,045,608 | 8/1977 | Bauer ...................... | 267/120 |
| 4,228,912 | 10/1980 | Harris et al. ............. | 220/80 X |
| 4,405,027 | 9/1983 | Enokimoto et al. ...... | 180/312 X |
| 4,632,370 | 12/1986 | Ticks et al. .............. | 267/140.1 X |
| 4,739,979 | 4/1988 | Kanda ...................... | 267/140.1 |
| 4,741,521 | 5/1988 | Schiffner et al. ......... | 267/141.2 X |
| 4,790,520 | 12/1988 | Tanaka et al. ............ | 267/140.1 C |

FOREIGN PATENT DOCUMENTS

| | | | |
|---|---|---|---|
| 0620265 | 5/1961 | Canada ..................... | 277/169 |
| 0027751 | 4/1981 | European Pat. Off. ... | 180/312 |
| 1059009 | 3/1984 | France ....................... | 267/141.3 |
| 0205503 | 9/1986 | Japan ......................... | 267/140.1 |
| 0274130 | 12/1986 | Japan ......................... | 248/562 |

Primary Examiner—George E. A. Halvosa
Attorney, Agent, or Firm—Oliff & Berridge

[57] ABSTRACT

A fluid-filled cushioning device having a cylindrical elastic body mounted on an inner sleeve and having an orifice structure with an orifice formed therethrough is disclosed. A pair of annular elastic members each having a retainer member and an outer sleeve are mounted on the inner sleeve such that the retainer member is press-fitted in the axial end portion of the inner sleeve while the orifice structure is sandwiched between the axial end faces of the outer sleeves, in the axial direction. A bracket is mounted on the outer sleeves of the elastic members and is fixed to a support member, so that the bracket forces the outer sleeves against the orifice structure. The inner sleeve, elastic body and elastic members define two fluid-filled chambers which are separated from each other by the elastic body and which communicate with each other through the orifice. An axial dimension of each elastic member before being mounted on the inner sleeve is determined to permit each elastic member to be axially compressed upon mounting of the elastic members, so that the outer sleeves are urged against the orifice structure with a force sufficient to maintain fluid tightness between the elastic members and the orifice structure, whereby the mounting of the bracket on the outer sleeves of the elastic members may be effected in a condition that the fluid chambers are filled with the fluid.

11 Claims, 6 Drawing Sheets

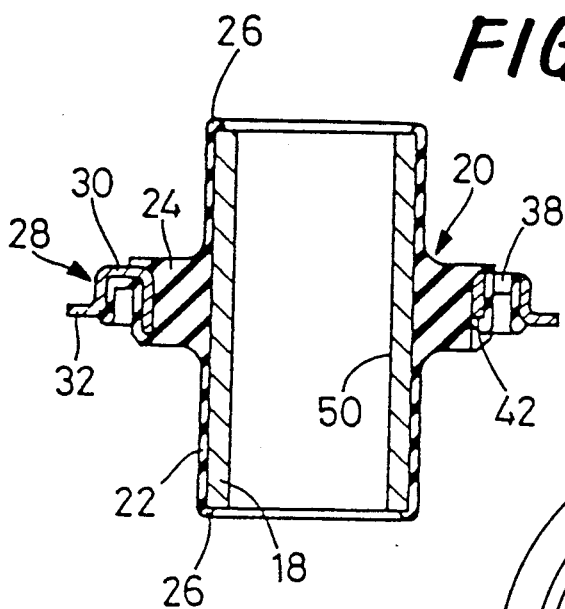
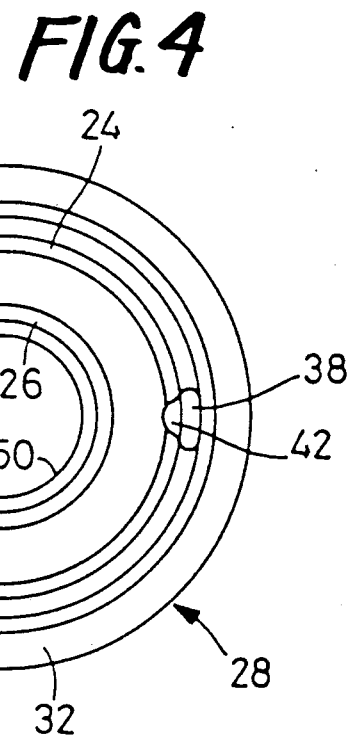
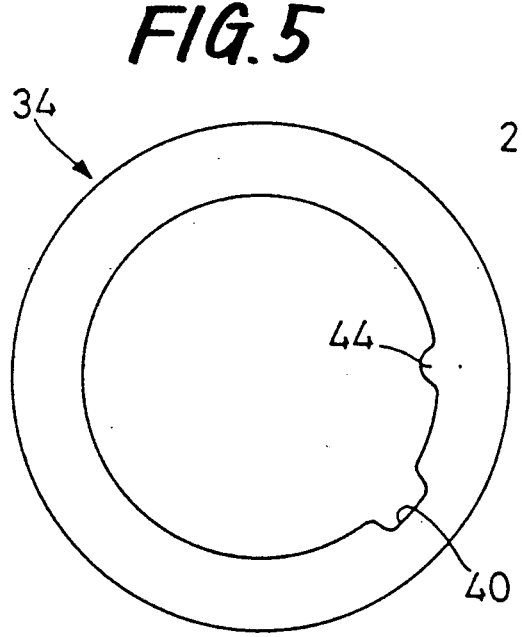
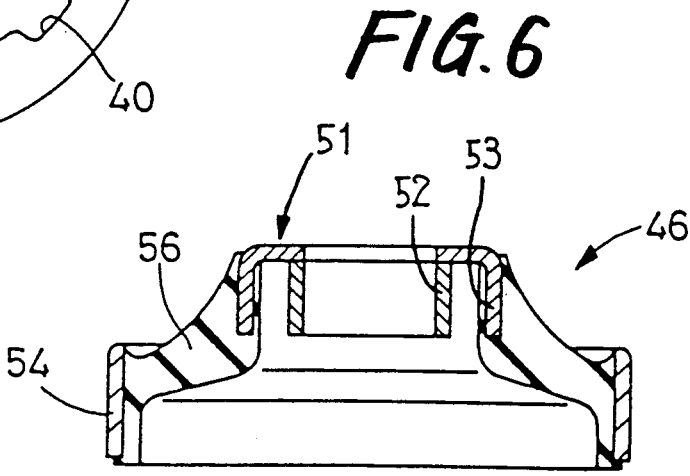

FLUID-FILLED CUSHIONING DEVICE HAVING SEALING ARRANGEMENT FOR EASY ASSEMBLING

BACKGROUND OF THE INVENTION

1. Field of the Invention

The present invention relates generally to a cushioning device disposed between two members, for damping or isolating vibrations applied thereto primarily in its axial direction, and more particularly to a technique for increased ease of assembling of a fluid-filled cushioning device for damping or isolating input vibrations, based on flows of a non-compressible fluid within the device.

2. Discussion of the Prior Art

Various types of fluid-filled cushioning devices have been recently proposed as a vibration damping/isolating mount or support disposed between two members of a vibration system. A cushioning device of these types is filled with a suitable non-compressible fluid, for damping and/or isolating input vibrations, in dependence on flows of the fluid through an orifice or restricted fluid passage formed in the device, or by utilizing an effect of inertia of the fluid mass.

An example of such a fluid-filled cushioning device is a strut bar cushion used in a vehicle suspension system, which is connected between a shaft member such as a strut bar, and a suitable support member such as a body of the vehicle, in order to damp or isolate mainly a vibrational load applied in its axial direction.

A commonly known fluid-filled cushioning device includes (a) an inner sleeve through which a suitable shaft member is inserted for attachment to the device, (b) a cylindrical elastic body mounted on an axially intermediate portion of the inner sleeve and provided at its outer circumferential portion with orifice-defining means which has an orifice formed therethrough, (c) a pair of annular elastic members each having an integrally formed inner retainer member and an integrally formed outer sleeve which are spaced apart from each other in an axial direction of the elastic members, the elastic members being mounted on the inner sleeve such that the inner retainer member is press-fitted in a corresponding one of opposite axial end portions of the inner sleeve while the orifice-defining means of the cylindrical elastic body is sandwiched by and between corresponding axial end faces of the outer sleeves of the annular elastic members, in the axial direction of the elastic members, and such that the inner sleeve, the cylindrical elastic body and the pair of annular elastic members cooperate with each other to define two fluid chambers which are filled with a suitable non-compressible fluid and which are separated from each other by the elastic body and communicate with each other through the orifice, and (d) a cylindrical bracket which is mounted on outer circumferential surfaces of the outer sleeves of the annular elastic members, and which is attached to a suitable support member.

In the thus constructed fluid-filled cushioning device, the mounting of the annular elastic members on the inner sleeve, and the mounting of the cylindrical bracket on the outer sleeves of the annular elastic members, are both conducted within a mass of the non-compressible fluid, so that the fluid chambers are filled with the fluid. The two outer sleeves of the annular elastic members are forced against each other in the opposite axial directions by the cylindrical bracket, so that fluid tightness of the fluid chambers is maintained.

In the known fluid-filled cushioning device constructed as described above, however, the mere mounting of the pair of annular elastic members on the inner sleeve does not establish fluid tightness of the fluid chambers which are defined in the intermediate assembly of the inner sleeve and the elastic members. Accordingly, the cylindrical bracket must be mounted on the outer sleeves of the annular elastic members, also within the fluid mass, following the mounting of the elastic members on the inner sleeve. This mounting of the cylindrical bracket is difficult, since the bracket should be subjected to an operation to urge the outer sleeves against each other within the fluid mass. Therefore, the assembling efficiency is comparatively low. Further, there may be left the fluid within spaces other than the fluid chambers, for instance, within a clearance between the outer surfaces of the outer sleeves and the inner surface of the cylindrical bracket. The fluid in such spaces may leak during installation or use of the cushioning device on the vehicle body, causing undesirable contamination of the device itself and the environment of the device.

SUMMARY OF THE INVENTION

It is therefore an object of the present invention to provide a fluid-filled cushioning device which is easy to assemble, and which assures fluid tightness of its fluid chambers.

Another object of the invention is to provide such a fluid-filled cushioning device which permits mounting of its cylindrical bracket on its annular elastic members, in the atmosphere.

The above objects may be achieved according to the principle of the present invention, which provides a fluid-filled cushioning device connected to two support members for damping vibrations applied therebetween, comprising an inner sleeve through which one of the two support members is inserted for attachment thereto, a cylindrical elastic body, a pair of annular elastic members and a cylindrical bracket. The cylindrical elastic body is mounted on an axially intermediate portion of the inner sleeve. The elastic body is provided at its outer circumferential portion with orifice-defining mean which has an orifice formed therethrough.

Each annular elastic member has an integrally formed inner retainer member and an integrally formed outer sleeve which are spaced apart from each other in an axial direction of the elastic members. These annular elastic members are mounted on the inner sleeve such that the inner retainer member is press-fitted in a corresponding one of axial end portions of the inner sleeve while the orifice-defining means of the cylindrical elastic body is sandwiched by and between corresponding axial end faces of the outer sleeves of the pair of annular elastic members, in the axial direction.

The cylindrical bracket is mounted on outer circumferential surfaces of the outer sleeves of the annular elastic members, and is fixed to the other of the two support members. The bracket is adapted to force the outer sleeves of the elastic members against each other via the orifice-defining means in the axial direction. The inner sleeve, the cylindrical elastic body and the annular elastic members cooperate with each other to define two fluid chambers which are separated from each other by the elastic body and which communicate with each other through the orifice. The fluid chambers are filled with a non-compressible fluid.

An axial dimension of the each annular elastic member before mounted on the inner sleeve is determined to permit each annular elastic member to be axially compressed upon mounting of the pair of annular elastic members on the inner sleeve, so that the outer sleeves are urged against the orifice-defining means with a sufficient force to maintain fluid tightness between the pair of annular elastic members and the orifice-defining means, whereby the mounting of the cylindrical bracket on the outer sleeves of the elastic members may be effected in a condition that the two fluid chambers are filled with the non-compressible fluid.

In the fluid-filled cushioning device of the present invention constructed as described above, fluid tightness of the two fluid chambers is maintained owing to the elastic force produced by the pair of annular elastic members mounted on the inner sleeve. Therefore, the mounting of the cylindrical bracket on the outer sleeves of the annular elastic members can be accomplished in the atmosphere, after the annular elastic members are mounted on the inner sleeve, within a mass of the non-compressible fluid so as to fill the fluid chambers, and the thus prepared intermediate product is removed from the fluid mass. In other words, the fluid tightness of the intermediate product is tentatively established by the annular elastic members which are mounted on the inner sleeve so as to seal the fluid chambers, and the fluid tightness of the end product is permanently maintained by the cylindrical bracket which holds the outer sleeves of the annular elastic members in pressed abutting contact with each other via the orifice-defining means of the cylindrical elastic body.

As described above, the constructional arrangement of the instant fluid-filled cushioning device not only permits easy mounting of the bracket on the intermediate product, but also assures freedom from leakage of the fluid from the finally assembled device, which causes contamination of the assembling environment and the end product.

In one form of the fluid-filled cushioning device of the invention, the above-indicated one of the two support members which is inserted through the inner sleeve consists of a strut bar of a suspension system of a motor vehicle, while the other of the two support members which is attached to the cylindrical bracket consists of a body of the vehicle.

In another form of the present invention, the inner sleeve and the cylindrical elastic body having the orifice-defining means constitute a first intermediate component prepared in the process of manufacture of the device, while the pair of annular elastic members are prepared as second intermediate components which are mounted on the inner sleeve of the first intermediate component, within a mass of the non-compressible fluid. The cylindrical bracket is mounted on the outer sleeves of the second intermediate components after an assembly of the first and second intermediate components is removed from the mass of the non-compressible fluid.

In a further form of the present invention, each annular elastic member includes an annular rubber wall which connects the inner retainer member and the outer sleeve so that the outer sleeves of the pair of annular elastic members are urged against the orifice-defining means by axial elastic deformation of the annular rubber walls of the elastic members.

In a still further form of the invention, the orifice-defining means comprises a first orifice-defining metal member secured to the outer circumferential portion of the cylindrical elastic body, and a second orifice-defining metal member which is aligned with the first orifice-defining metal member such that the first and second orifice-defining metal members cooperate with each other to define the orifice.

In one arrangement of the above form of the invention, the first orifice-defining metal member has a U-shaped portion defining an annular groove, and the second orifice-defining metal member has an annular portion which closes the annular groove so as to define an annular passage between the U-shaped portion and the annular portion. The U-shaped portion has a through hole communicating with the annular passage and one of the two fluid chambers, while the annular portion has a cutout which communicates with the annular passage and the other of the two fluid chambers. The annular passage, the through hole and the cutout cooperate with each other to define the orifice.

In a yet further form of the present invention, the cylindrical elastic body includes a partition rubber member which has a thin-walled rubber layer covering an outer circumferential surface of the inner sleeve, and further has a partition wall portion which extends radially outwardly from an axially intermediate portion of the rubber layer. The rubber layer has a sealing portion which covers an outer edge part of at least one of opposite axial end faces of the inner sleeve. The retainer member is fitted in the corresponding one of the axial end portions of the inner sleeve such that the retainer member is held in pressed abutting contact with the sealing protion of the rubber layer.

In one arrangement of the above form of the invention, the outer edge part of the above-indicated at least one end face of the inner sleeve provides a relief portion which is covered by the sealing portion of the rubber layer. The retainer member has a cylindrical wall portion fitted in the corresponding one of the opposite axial end portions of the inner sleeve, and an abutting surface which is held in contact with the end face of the inner sleeve and the sealing portion of the rubber layer such that a clearance defined by the abutting surface of the retainer member and the relief portion of the inner sleeve is filled by the sealing portion. In this case, the relief portion may consist of a rounded outer edge of the end face, a chamferred outer edge of the end face, or the outer edge part whose edge is removed so as to form a rectangular cutout.

According to the above arrangement, the abutting surface of the retainer member and the end face of the inner sleeve are held in direct abutting contact with each other, while at the same time the clearance defined by the abutting surface and the end face is filled by the elastically compressed and deformed sealing portion of the rubber layer. Hence, the retainer member is securely fastened to the inner sleeve, while the fluid tightness between these two members is maintained by the sealing portion of the rubber layer. Further, the direct contact of the abutting surface of the retainer member with the end face of the inner sleeve prevents reduction of the sealing performance of the sealing portion and rattling or looseness of the retainer member with respect to the inner sleeve, which would occur due to fatigue of the sealing portion if the abutting surface of the retainer member and the end face of the inner sleeve is held apart from each other by the sealing portion. Thus, the present arrangement assures improved sealing capability and durability between the inner sleeve and the retainer member.

In another arrangement of the above form of the invention, the thin-walled rubber layer has at least one annular lip formed axially inwardly of the sealing portion.

According the present invention, there is also provided a sealing structure between a first member having a first abutting surface, and a second member which has a second abutting surface on an end face thereof and a surface adjacent to the end face and covered by a rubber layer, the first and second members being assembled with respect to each other such that the first and second abutting surfaces are held in abutting contact with each other, the sealing structure comprising a relief portion provided on an edge which is defined by the end face of the second member and the surface of the second member covered by the rubber layer, such that a clearance is formed between the first abutting surface of the first member and the relief portion of the second member while the first and second abutting surfaces are held in abutting contact with each other. The rubber layer has an elastic sealing portion which integrally extends therefrom so as to cover the relief portion. The sealing portion protrudes in a direction perpendicular to the second abutting surface when the first and second abutting surfaces are spaced apart from each other. The sealing portion is elastically deformed upon abutment of the first and second abutting surfaces on each other, whereby the clearance is filled by the sealing portion so as to maintain fluid tightness between the first and second members.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which:

FIG. 3 is an elevational view in axial cross section of a first intermediate component of the strut bar cushion, which includes an inner metal sleeve, and a cylindrical elastic body which is formed by vulcanization on the inner metal sleeve, together with a first orifice-defining metal member;

FIG. 4 is a bottom plan view of the intermediate product of FIG. 3;

FIG. 5 is a plan view of a second orifice-defining metal member;

FIG. 6 is an elevational view in cross section of one of a pair of second intermediate components in the form of annular elastic members each formed by vulcanization with a retainer member and an outer metal sleeve;

DETAILED DESCRIPTION OF THE PREFERRED EMBODIMENTS

Figure 1:
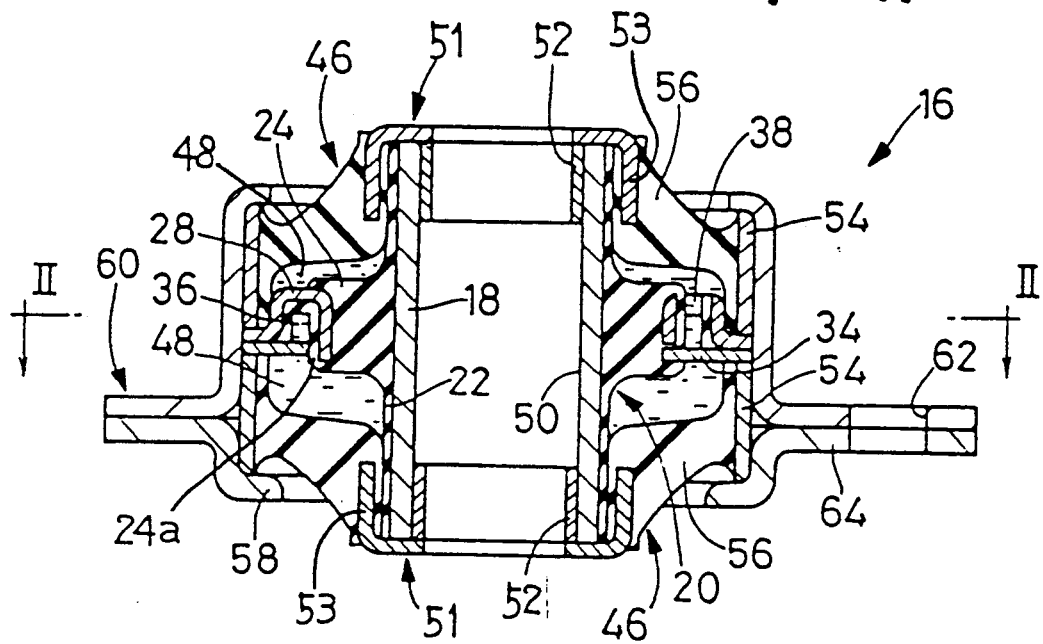
FIG. 1 is an elevational view in axial cross section (taken along line I—I of FIG. 2) of one embodiment of the invention in the form of a strut bar cushion.
Figure 10:
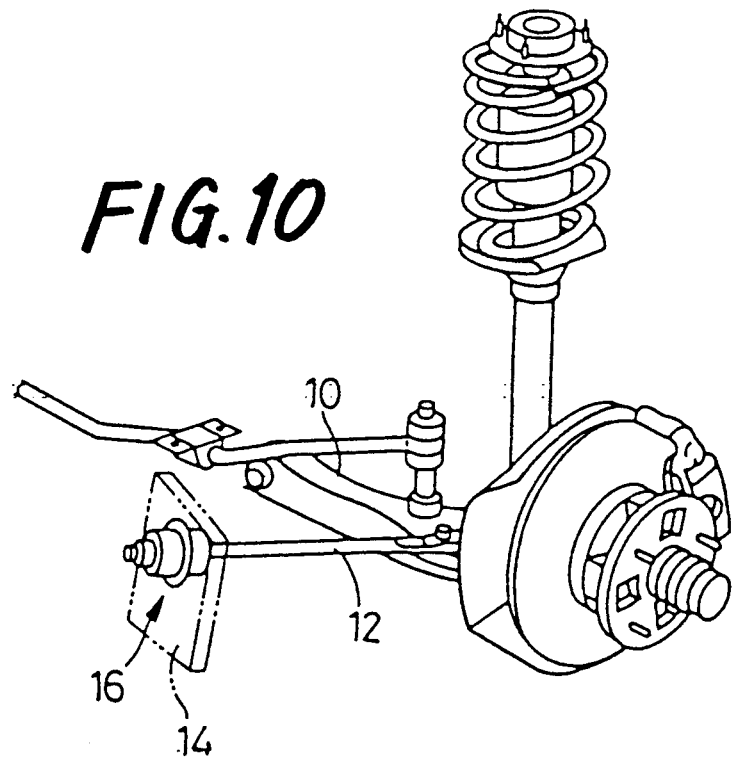
FIG. 10 is a perspective view of a relevant part of the vehicle, indicating the manner in which the strut bar cushion is installed on the vehicle.

Referring first to FIGS. 1 and 10, the strut bar cushion is indicated generally at 16. As shown in FIG. 10, the strut bar cushion 16 is used in a suspension system of a motor vehicle such that the cushion 16 is disposed between a strut bar 12 which is connected at its one end to a suspension arm 10 of the vehicle, and a body 14 of the vehicle. The strut bar cushion 16 functions primarily for damping and isolating vibrations which are applied thereto in its axial direction.

The construction of the instant strut bar cushion 16 will be described in detail, by reference to FIGS. 1 through 9.

Figure 2:
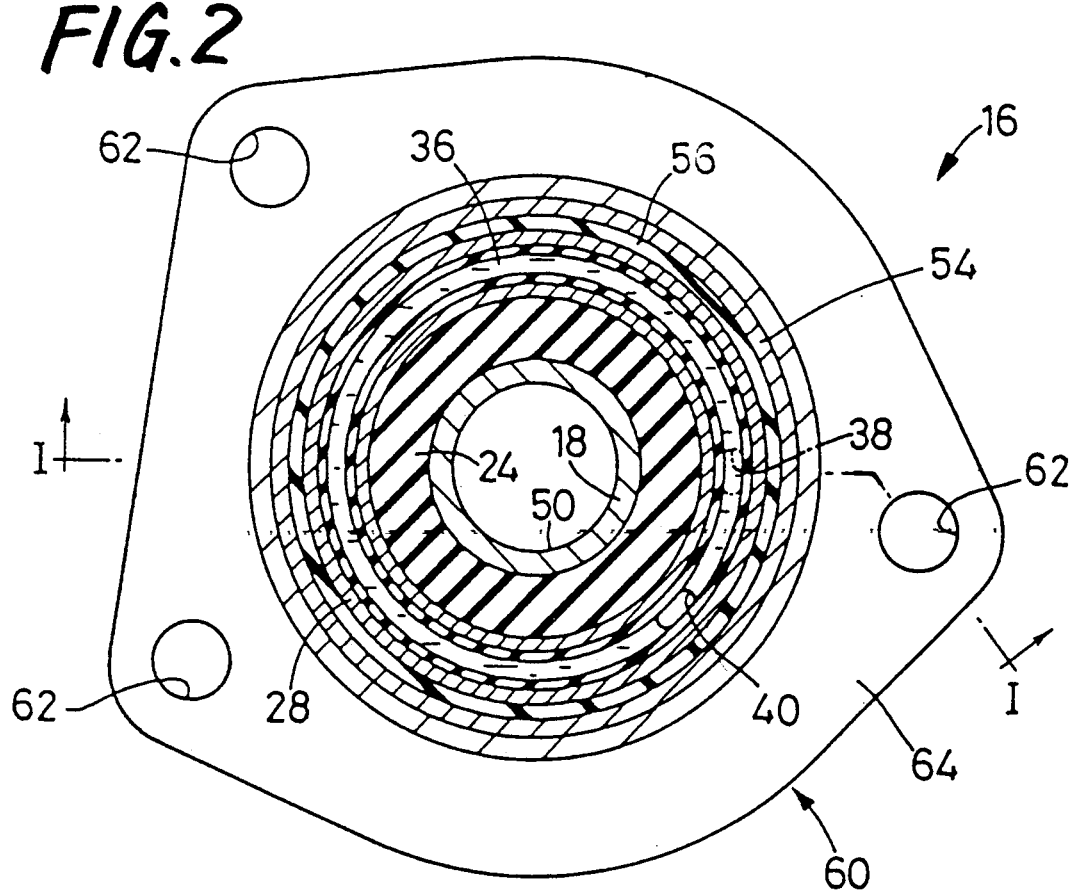
FIG. 2 is a cross sectional view taken along line II—II of FIG. 1.

In the axial and transverse cross sectional views of FIGS. 1 and 2, reference numeral 18 designates a cylindrical inner metal sleeve. As also shown in FIGS. 3 and 4, a cylindrical elastic body in the form of a partition rubber member 20 is formed by vulcanization on the outer circumferential surface of the inner metal sleeve 18.

Described more specifically, the partition rubber member 20 consists of a thin-walled cylindrical portion 22 secured to the entire outer circumferential surface of the inner metal sleeve 18, and a partition wall portion 24 which is formed integrally with the thin-walled portion 22 such that the partition wall portion 24 extends radially outwardly from an axially intermediate part of the thin-walled portion 22. Thus, the partition wall portion 24 has a considerably larger outside diameter than the thin-walled portion 22. As shown most clearly in FIG. 3, the outer edges of the opposite end faces of the inner metal sleeve 18 are covered by the opposite ends of the thin-walled cylindrical portion 22 of the partition rubber member 20. That is, a sealing portion 26 extends from each axial end of the thin-walled portion 22, for the purpose which will be described. Several modifications of the sealing portion 26 will be described with respect to the other embodiments of the invention.

While the partition rubber member 20 is formed by vulcanization of an unvulcanized rubber material, a first orifice-defining metal member 28 having a generally substantially annular shape is secured to a radially outer part of the partition wall portion 24. This first orifice-defining metal member 28 consists of a groove portion 30 defining a U-shaped groove which extends along its entire circumference, and a flange portion 32 which extends radially outwardly from an outer wall of the groove portion 30. The metal member 28 is positioned with respect to the partition rubber member 20 such that the U-shaped groove is open in the axial direction of the strut bar cushion 16. The metal member 28 is secured to the partition wall portion 24 such that an inner wall of the groove portion 30 is embedded in the radially outer part of the partition wall portion 24.

Referring next to FIG. 5, there is illustrated a second orifice-defining metal member 34 which also has a generally annular shape. This second orifice-defining metal member 34 is aligned with the first orifice-defining metal member 28, such that the second metal member 34 closes an opening of the circumferential groove defined by the first metal member 28. The inner wall of the groove portion 30 of the first orifice-defining metal member 28 has a larger axial dimension than the outer wall, and the inner circumference of the second orifice-defining metal member 34 is held in abutting contact with the outer circumferential surface of the inner wall of the groove portion 30, via a thin rubber layer 24a of the partition rubber member 20, as indicated in FIG. 1, whereby fluid tightness between the mutually abutting surfaces of the two orifice-defining metal members 28, 34 is maintained.

The first orifice-defining metal member 28 has a recess 42 in the inner wall of the groove portion 30, as shown in FIG. 4, while the second orifice-defining metal member 34 has a protrusion 44 on the inner circumferential surface, as shown in FIG. 5. These recess and protrusion 42, 44 engage each other, whereby the relative circumferential position of the two metal members 28, 34 is determined. Further, the first metal member 28 has a through hole 38 in the bottom wall of the groove portion 30, as shown in FIGS. 1-4, while the second metal member 34 has a cutout 40 formed on the inner circumference, as shown in FIGS. 2 and 5. With the two metal members 28, 34 positioned relative to each other as described above, the circumferential passage defined by the two metal members 28, 34 communicates with fluid chambers 48 (which will be described) through the through hole 38 and the cutout 40. Thus, an orifice in the form of a restricted passage 36 is formed through the cylindrical elastic body in the form of the partition rubber member 20. It will be understood from the above description that the first and second orifice-defining metal members 28, 34 constitute means for defining the orifice 36.

FIG. 3 shows a first intermediate component prepared in the process of manufacture of the strut bar cushion 16. The first intermediate component is prepared by suitably positioning the inner metal sleeve 18 and first and second orifice-defining metal members 28, 34, such that the thin-walled cylindrical portion 22 of the partition rubber member 20 is secured to the outer circumferential surface of the inner metal sleeve 18, and the first orifice-defining metal member 28 is secured to the radially outer part of the partition wall portion 24 of the partition rubber member 20 while the second orifice-defining metal member 34 is aligned with the first orifice-defining metal member 28 as described above. With the three metal members 18, 28, 34 thus positioned in a mold, a suitably prepared unvulcanized rubber material is poured into the mold, and the rubber material is vulcanized in a known manner, whereby the first intermediate component of FIG. 3 is obtained.

FIG. 6 shows one of a pair of annular elastic members 46, 46 which are second intermediate components also prepared in the process of manufacture of the cushion 16. These annular elastic members 46, 46 are mounted on the opposite axial end portions of the first intermediate component of FIG. 3, so that the two annular fluid chambers 48, 48 are defined by the first and second intermediate components, that is, by the inner metal sleeve 18, partition rubber member 20 (cylindrical elastic body) and the two annular elastic members 46, 46. The fluid chambers 48, which are separated by the partition rubber member 20, are held in fluid communication with each other through the orifice 36 defined by the first and second orifice-defining metal members 28, 34 secured to the partition rubber member 20.

Described more specifically by reference to FIG. 6, each annular elastic member or second intermediate component 46 consists of: a metallic retainer member 51 secured to the appropriate end of the inner metal sleeve 18; an outer metal sleeve 54 which is disposed radially outwardly of the retainer member in coaxial relation with the inner metal sleeve 18; and an annular rubber wall 56 which is disposed between the retainer member 51 and the outer metal sleeve 54 and is secured thereto by vulcanization. The retainer member 51 has an inner wall 52 and an outer wall 53 which define an annular groove. This annular groove is U-shaped in cross section and is open in the axial direction of the inner metal sleeve 18. The inner wall 52 is press-fitted in the appropriate end of the inner metal sleeve 18 as shown in FIG. 1. The retainer member 51 and the outer metal sleeve 54 are spaced apart from each other by a suitable distance in the axial direction. The annular rubber wall 56 is secured at its inner circumference to the outer wall 53 of the retainer member 51, and at its outer circumference to the inner circumferential surface of the outer metal sleeve 54.

The pair of thus constructed second intermediate components or annular elastic members 46, 46 are mounted on the first intermediate component of FIG. 3 consisting of the inner metal sleeve 18 and the partition rubber member 20, such that the inner wall 52 is press-fitted in the appropriate axial end portion of the inner metal sleeve 18, while the outer circumferential portions of the aligned and superposed first and second orifice-defining metal members 28, 34 are sandwiched by and between the opposite end faces of the two outer metal sleeves 54, 54. Thus, there is prepared an intermediate product as shown in FIG. 7, which has the two annular fluid chambers 48, 48 which are disposed on both sides of the partition wall portion 24 of the partition rubber member 20 and which communicate with each other through the orifice 36.

Figure 7:
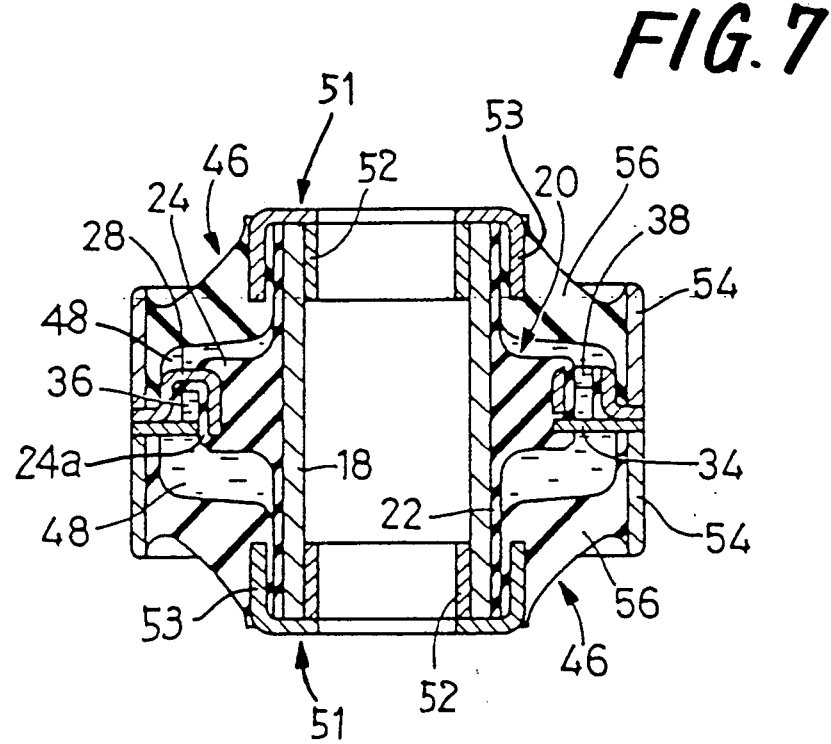
FIG. 7 is an elevational view in axial cross section of an intermediate product prepared in the process of manufacture of the strut bar cushion, which product consists of the first and second intermediate components which are assembled with respect to each other.

The end face of the outer circumferential portion of the annular rubber wall 56 of each annular elastic member 46 is held in abutting contact with the corresponding first or second orifice-defining metal member 28, 34, adjacent to the outer circumferential edge portion sandwiched by the two outer metal sleeves 54, 54, as indicated in FIGS. 1 and 7. Thus, fluid tightness between the orifice-defining metal members 28, 34 and the outer metal sleeves 54, 54 is maintained. Further, fluid tightness between the retainer members 51 of the annular elastic members 46 and the corresponding opposite end faces of the inner metal sleeve 18 is maintained by the sealing portions 26 which extend from the opposite ends of the thin-walled cylindrical portion 22 of the partition rubber member 20.

Each annular elastic member 46 is prepared such that its axial dimension before it is mounted on the inner metal sleeve 18 is sufficient to permit the annular rubber wall 56 to be axially compressed so as to produce a sufficient urging force which acts on the outer metal sleeve 54 of the other annular elastic member 46 via the orifice-defining metal members 28, 34, when the annular elastic members 46 are mounted on the inner metal sleeve 18. In other words, the axial dimension of the annular elastic members 46 as prepared or prior to its mounting on the inner metal sleeve 18 is longer by a suitable amount than the axial dimension after the elastic members 46 have been mounted on the inner metal sleeve 18, so that the annular rubber walls 56 can be properly axially compressed to hold the two elastic members 46, 46 in pressed contact with the first and second orifice-defining metal members 28, 34 with a suitable force.

In the thus prepared intermediate product shown in FIG. 7 wherein the retainer members 51 are press fitted in the appropriate opposite end portions of the inner metal sleeve 18, the first and second orifice-defining metal members 28, 34 are gripped by and between the outer metal sleeves 54, 54, and in pressed contact with the end faces of the annular rubber walls 56, 56, with suitable forces, whereby the fluid tightness between these elements is assured.

The fluid chambers 48 and the orifice or restricted passage 36 are filled with a suitable non-compressible fluid such as water and alkylene glycol.

According to the principle of the present invention, the annular elastic members or second intermediate products 46, 46 are mounted on the inner metal sleeve 18, within a mass of the selected non-compressible fluid, so that the fluid chambers 48 can be easily filled with the fluid while the annular elastic members 46 are mounted. Since the annular elastic members 46, 46 are held in pressed contact with the inner metal sleeve 18 and the orifice-defining metal members 28, 34, so as to maintain fluid tightness therebetween, the fluid will not leak from the fluid chambers 48, 48 after the annular elastic members 46, 46 have been properly attached to the inner metal sleeve 18 in the manner as described above.

Figure 8:
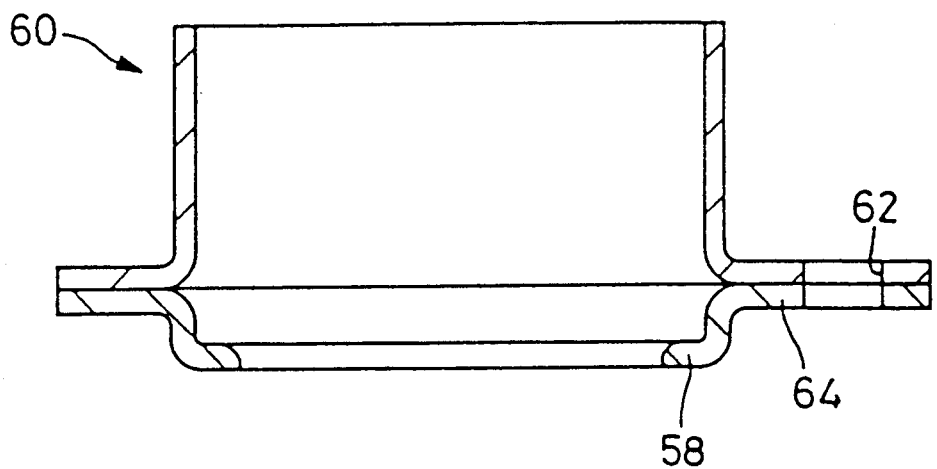
FIG. 8 is a cross sectional view of a cylindrical bracket which is another component of the strut bar cushion.

Then, a cylindrical bracket 60 shown in FIG. 8 is fitted on the outer circumferential surfaces of the outer metal sleeves 54, 54 of the intermediate product of FIG. 7 wherein the second intermediate components 46, 46 are fluid tightly mounted on the first intermediate component 18, 20. The bracket 60 has an inward flange 58 formed at one of its opposite axial ends, and a fixing outward flange 64 which has fixing holes 62 for bolts for attaching to the vehicle body. As indicated in FIG. 1, the axial end portion of the bracket 60 remote from the inward flange 58 is caulked against the upper annular elastic member 46 (as seen in FIG. 1) while the inward flange 58 is held in contact with the lower annular elastic member 46. As a result, the outer metal sleeves 54, 54 are forced against each other via the outer circumferential portions of the first and second orifice-defining metal members 28, 34, with the end faces at the outer circumferential portions of the annular rubber walls 56, 56 held in pressed contact with the orifice-defining metal members 28, 34. In this way, the fluid tightness between the orifice-defining metal members 28, 34 and the outer metal sleeves 54, 54 is maintained. Thus, the strut bar cushion 16 is prepared.

Since the annular elastic members 46, 46 are mounted on the inner metal sleeve 18 and the partition rubber member 20, with the fluid chambers 48, 48 properly sealed with the abutting contact of the annular rubber walls 56, 56 with the inner metal sleeve 18 and the partiton rubber wall 20, the mounting of the cylindrical bracket 60 on the intermediate product of FIG. 7 can be accomplished in the atmosphere, namely, after the intermediate product is removed out of the fluid mass in which the first and second intermediate components 18, 20, 46 are assembled with respect to each other. Finally, the fluid tightness of the fluid chambers 48, 48 is permanently established by the abutting contact of the annular elastic members 46, 46 with each other, by caulking the bracket 60 against the intermediate product of FIG. 7.

Figure 9:
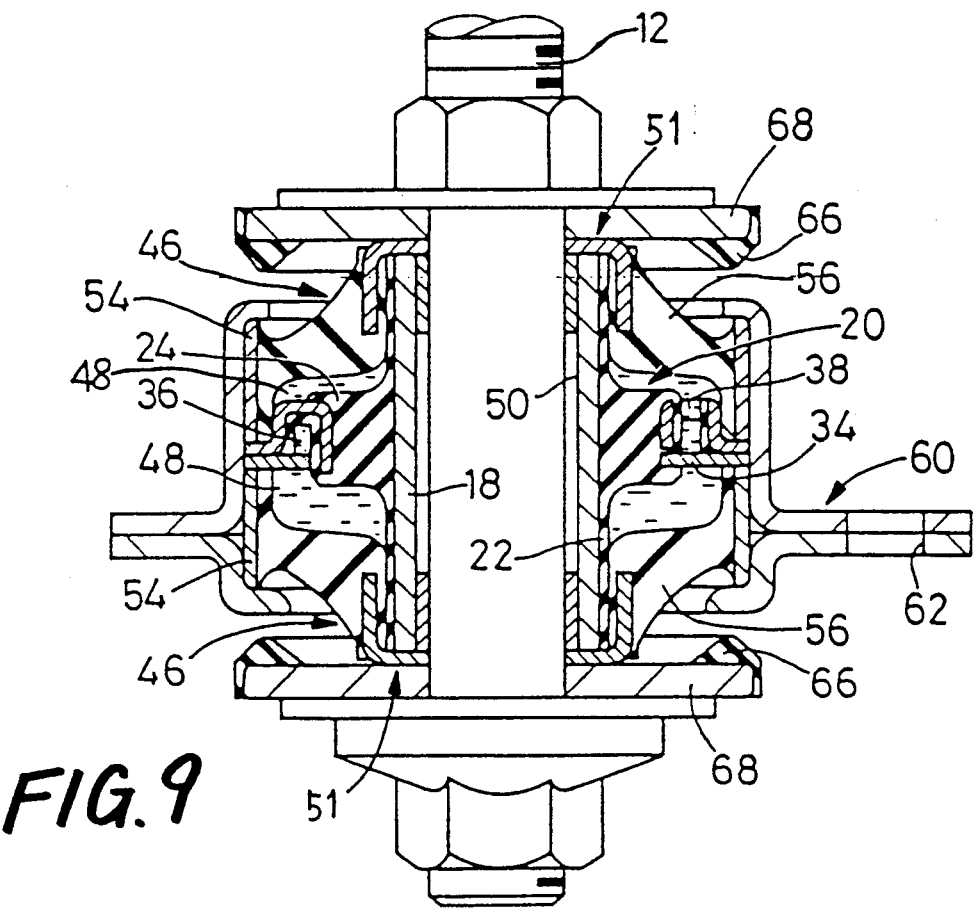
FIG. 9 is an elevational view in axial cross section of the strut bar cushion attached to a strut bar of a motor vehicle.

For example, the thus constructed strut bar cushion 16 is installed between the strut bar 12 and the vehicle body 14, such that the strut bar 12 of the vehicle is inserted through a bore formed through the inner metal sleeve 18, while the bracket 60 is fixed to the vehicle body 14 with the bolts inserted through the fixing holes 62 formed through the outward flange 64 of the bracket 60, as illustrated in FIG. 9. Preferably, a pair of displacement limiting plates 68, 68 are mounted on the opposite axial ends of the inner metal sleeve 18, for limiting an axial displacement of the inner metal sleeve 18 relative to the bracket 60. Each displacement limiting plate 68 has an annular rubber stop 66 formed on its axially inner surface, so that the stop 66 may abut on the corresponding axial end of the bracket 60.

With the strut bar cushion 16 connected between the strut bar 12 and the vehicle body 14, an axial vibrational load applied between the inner metal sleeve 18 and the bracket 60 will cause elastic deformation of the partition rubber member 20 and the annular rubber walls 56, 56 in their shear direction, which in turn causes the fluid to flow from one of the two fluid chambers 48, 48 to the other through the orifice 36. Consequently, the input vibrations are damped by the restricted fluid flow through the orifice 36, as well as by the elastic deformation of the rubber members 20, 56, as well known in the art. The vibration damping or isolation based on the fluid flow is associated with the fluid flow resistance of the orifice 36, and the inertia of the fluid masses which tend to remain in the fluid chambers 48, 48. It is noted that the frequency of the vibrations damped by the fluid relates to the configuration of the orifice 36.

As described above, the strut bar cushion 16 constructed according to this form of the invention can be easily assembled owing to the tentative sealing of the fluid chambers 48, 48 of the intermediate product of FIG. 7, which permits easy mounting of the bracket 60 in the atmosphere. More particularly, the fluid chambers 48, 48 and the orifice 36 are filled with the fluid while the annular elastic members 46, 46 are mounted on the inner metal sleeve 18. Only this assembling step is effected within a mass of the fluid used. Then, the prepared intermediate product of FIG. 7 is removed out of the fluid mass, and the bracket 60 is mounted on the intermediate product, so as to establish permanent fluid tightness of the strut bar cushion 16.

Since the bracket 60 is mounted on the intermediate product of FIG. 7 in the atmosphere, no fluid is left between the bracket 60 and the outer metal sleeves 54, 54. Therefore, the instant strut bar cushion 16 does not suffer a conventionally encountered problem caused by a fluid mass which undesirably remains between a bracket and an outer sleeve and which may leak and contaminate the cushion, during assembling and use of the cushion.

While the concept of the present invention has been described in its preferred embodiment in the form of a strut bar cushion for an automotive vehicle, the concept may be applied to other forms of fluid-filled cushioning device.

It will be understood that the cushioning device according to the present invention is characterized by the first intermediate component 18, 20 and the second intermediate components 46, 46 which are assembled into the intermediate product of FIG. 7, within a fluid mass, and the bracket 60 which is mounted on the intermediate product in the atmosphere. In other words, the present invention is not limited to the illustrated specific configurations of the elastic members 20, 56, fluid chambers 48, 48, orifice 36, and other members. The configurations of these members may be modified as desired, depending upon the application and requirements of the cushioning device.

Figure 11:
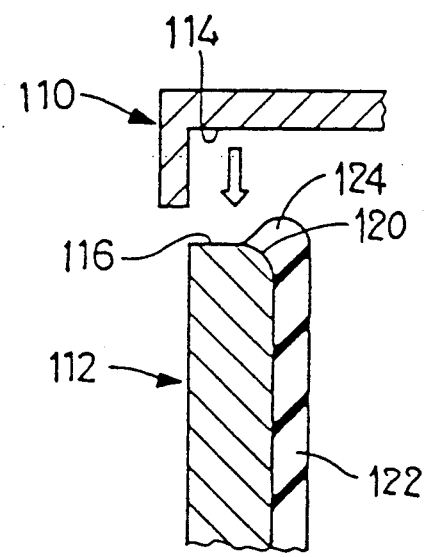
FIG. 11 is a fragmentary elevational view in cross section of a sealing arrangement between the inner metal sleeve and the retainer member of another embodiment of the invention.
Figure 12:
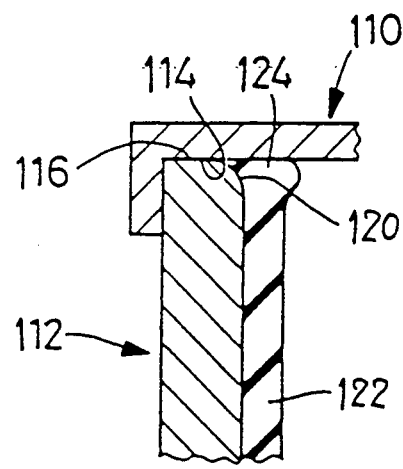
FIG. 12 is a fragmentary cross sectional view showing the inner metal sleeve and the retainer member which are assembled with respect to each other.

Referring next to FIGS. 11 and 12, there will be described another embodiment of the fluid-filled cushioning device, wherein reference numerals 110 and 112 designate first and second metal members corresponding to the retainer member 51 and inner metal sleeve 18 of the preceding embodiment, respectively. Namely, the present embodiment uses a modified sealing arrangement different from the sealing portion 26 provided in the preceding embodiment. Since the principle of the instant modified sealing arrangement can be applied to various metal members which are assembled with respect to each other so as to maintain fluid tightness therebetween, the members 110, 112 are referred to as the first and second metal members, rather than the retainer member and inner metal sleeve.

The first and second metal members 110, 112 are adapted to be held in pressed abutting contact with each other, at their abutting surfaces 114, 116, by a suitable fastening mechanism, such as a bolt-and-nut arrangement, or a caulking structure. While parts of the first and second metal members 110, 112 are shown in cross section in FIGS. 11 and 12, these members may take suitable shapes, e.g., cylindrical or planar shapes, and accordingly the abutting surfaces 114, 116 may be an annular surface, an linearly extending elongate surface, or other configurations.

As indicated in FIG. 11, the abutting surface 116 of the second metal member 112 has a round 120 at one of its opposite edges (at the right edge as seen in the figure). This round or rounded edge 120 serves as a relief portion with respect to the abutting surface 114 of the first metal member 110, when the abutting surfaces 114, 116 are held in abutting contact with each other. The radius of curvature of the rounded edge or relief portion 120 is determined so that the relief portion 120 and the abutting surface 114 provides a suitable clearance therebetween.

One of opposite surfaces of the second metal member 112 which is on the side of the rounded edge or relief portion 120 is coated with a thin rubber layer 122 (which corresponds to the thin-walled cylindrical portion 22 of the partition wall member 20 of the preceding embodiment), which is secured thereto by vulcanization or other means. One of the opposite ends of the thin rubber layer 122 terminates into a sealing portion 124 which adheres to and covers the rounded relief portion 120. The sealing portion 124 protrudes a suitable distance from the abutting surface 116 toward the abutting surface 114 of the first metal member 110, in the direction in which the abutting surfaces 114 and 116 are forced against each other.

More specifically, the first and second metal members 110, 112 are fastened to each other such that the abutting surfaces 114, 116 abut on each other, with the sealing portion 124 being elastically deformed while being squeezed between the abutting surface 114 and the rounded relief portion 120, as indicated in FIG. 12. Namely, the clearance defined between the abutting surface 114 and the relief portion 120 is filled by the elastically deformed sealing portion 124.

As indicated in FIG. 11, the sealing portion 124 covering the rounded relief portion or edge 120 of the second metal member 112 has a rounded end which assures a suitable area of contact with the abutting surface 114, and a suitable abutting force with respect to the abutting surface 114, when the abutting surfaces 114, 116 are in abutting contact with each other.

In the condition as shown in FIG. 12 wherein the first and second metal members 110, 112 are assembled to each other, a direct metallic contact exists between the two abutting surfaces 114, 116 while a fluid tight, pressed, sealing contact exists between the abutting surface 114 and the sealing portion 124 of the thin rubber layer 122. Consequently, the instant arrangement assures both rigid assembling of and prolonged sealing between the first and second metal members 110, 112, without reduced sealing capability and/or rattling noises which would otherwise occur due to fatigue of the rubber material of the sealing portion 124.

It will be understood from the above explanation that the abutting force between the sealing portion 124 and the abutting surface 114 of the first metal member 110, namely, the sealing effect provided by the sealing portion 124 can be easily adjusted to a suitable value, by changing the shape of the sealing portion 124, irrespective of the fastening force of the first and second metal members 110, 112, or without depending upon the desired strength or rigidity of the assembly 110, 112.

Further, the direct contact of the first and second metal members 110, 112 protects the sealing rubber portion 124 from an excessive load which is applied to the assembly 110, 112 in the direction indicated by arrow in FIG. 11, whereby the durability of the assembly is improved.

While the sealing arrangement including the rounded relief portion 120 has been described above by reference to FIGS. 11 and 12, it is possible to adopt various modified sealing arrangements for the assembly of the first and second metal members 110, 112 such as the retainer member 51 and the inner metal sleeve 18 of the strut bar cushion 16 according to the first embodiment.

Figure 13:
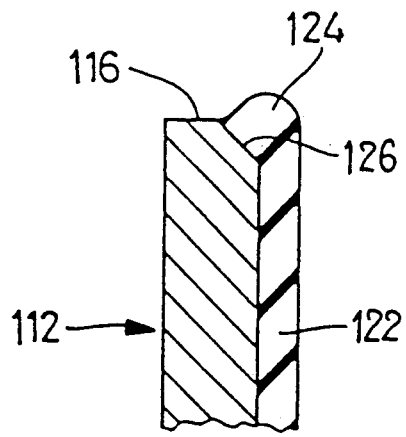
FIGS. 13 and 14 are views corresponding to that of FIG. 11, showing modified sealing arrangements used in further embodiments of the invention.
Figure 14:
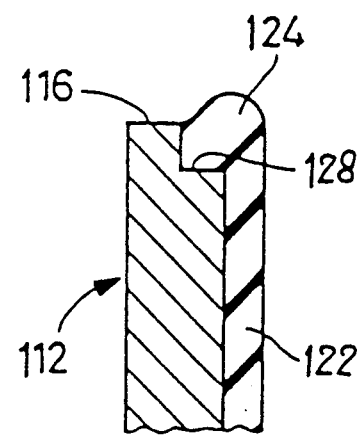

For example, FIG. 13 shows one modified sealing arrangement wherein one of the opposite edges of the abutting surface 116 of the second metal member 112 is chamferred as indicated at 126, whereby the second metal member 112 is provided with the chamferred relief portion 126. Another modified sealing arrangement is shown in FIG. 14, wherein one of the opposite edges of the abutting surface 116 is removed so as to provide a rectangular cutout 128, which serves as a relief portion of the second metal member 112. These chamferred and rectangularly-cut relief portions 126, 128 are covered by the sealing portion 124 of the thin rubber layer 122, as also indicated in FIGS. 13 and 14 wherein the first metal member 110 is not shown for interest of brevity. These modified embodiments have the same advantages as described with respect to the embodiment of FIGS. 11 and 12.

Figure 16:
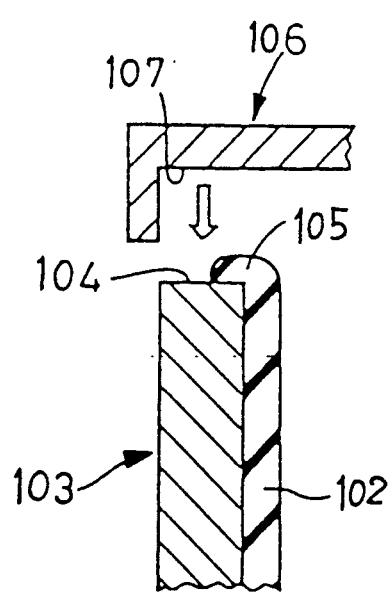
FIGS. 16 and 17 are views corresponding to those of FIGS. 11 and 12, showing a known sealing arrangement.
Figure 17:
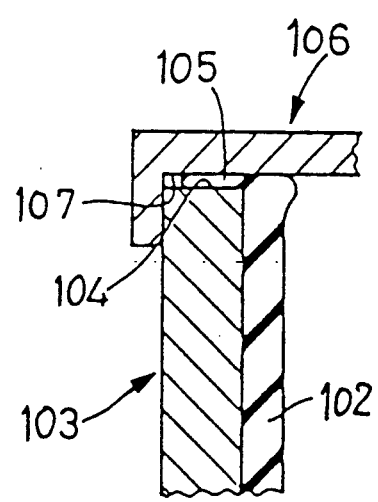

To prove the advantages of the sealing arrangements using the relief portion 120, 126, 128 and the sealing portion 124, an experiment was conducted on specimens each consisting of the first and second metal members 110, 112 which were prepared in the form of a retainer member (51) and an inner metal sleeve (18) as used in the first embodiment. The sealing function and durability of the specimens were tested with the first and second metal members 110, 112 fastened to each other by a bolt inserted through their axially central parts. The same test was conducted on a comparative example as shown in FIGS. 16 and 17, which consists of a first metal member 106 and a second metal member 103 which does not have a relief portion on its abutting surface 104. The outer circumferential surface of the second metal member 103 is coated with a thin rubber layer 102 which has a sealing end portion 105 covering one of opposite edges of the abutting surface 104. The first and second members 106 and 103 were fastened to each other such that an abutting surface 107 of the first metal member 106 was held in pressed abutting contact with the sealing portion 105 of the rubber layer 102. Test results of the experiment are indicated in Table 1.

The relief portion 120 of the first specimen according to the invention as illustrated in FIG. 11 has a radius of curvature of 1.0 mm, while the relief portion 126 of the second specimen of the invention as illustrated in FIG. 13 has a chamfer of 1.0 mm × 1.0 mm. Further, the relief portion 128 of the third specimen also according to the invention as illustrated in FIG. 14 has a rectangular cutout of 1.0 mm × 1.0 mm. The dimension (mm) indicated in Table 1 in connection with the sealing portion 124 (105) represents the radius of curvature of the rounded top of the sealing portion 124. It is noted that the center of the rounded top of the sealing portion 124 lies on a point of intersection between an extension line of the abutting surface 116 (104) and an extension line of the surface which is covered by the rubber layer 122 (102).

The sealing capability indicated in the table represents a maximum fluid pressure under which fluid tightness is obtained between the abutting surfaces 114, 116 (107, 104) of the first and second metal members 110, 112 (106, 103). The first and second metal members were tightened by applying a torque of 500 kg·cm to the fixing bolt. The thus obtained assembly of the first and second metal members was left at 70° C. for 250 hours. Then, the tightening torque of the bolt was measured. The fastening reliability indicated in the table represents a percentage of the measured tightening torque with respect to the initial tightening torque of 500 kg cm, i.e., 100 × (measured torque/500 kg cm).

TABLE 1

| Configuration of Sealing Portion | Sealing Portion 124 (105) (mm) | Sealing Capability kgf/cm$^2$ | Fastening Reliability (%) |
| --- | --- | --- | --- |
| Present Invention | | | |
| 120 | 1.0 | 48 | 90–95 |
| 120 | 0.8 | 40 | 100 |
| 120 | 0.5 | 37 | 100 |
| 126 | 1.0 | 48 | 90–95 |
| 128 | 1.0 | 48 | 90–95 |
| Comparative | | | |
| No Sealing Portion | 1.0 | 48 | 30–40 |

It follows from Table 1 that the sealing arrangements according to the embodiments of FIGS. 11–14 exhibited improved fastening reliability or durability over the conventional arrangement of FIGS. 16 and 17. In the conventional arrangement, the sealing portion 105 of the rubber layer 102 which directly receives a load applied to the assembly 103, 106 is likely to be deteriorated under heat or due to application of an excessive load, whereby there may arise looseness between the abutting surface 107 and the sealing portion 105, and a consequent relative rattling movement of the first and second metal members 106, 103.

Figure 15:
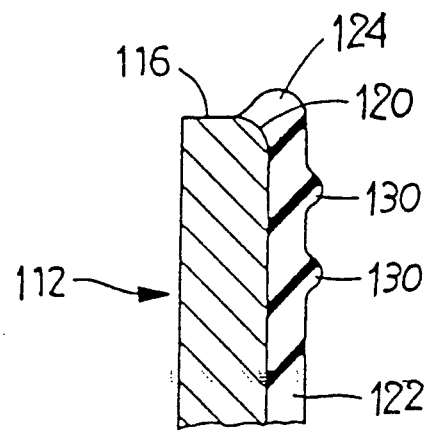
FIG. 15 is a fragmentary cross sectional view of the inner metal sleeve with a modified sealing rubber layer used in a still further embodiment of the invention.

In the embodiments of FIGS. 11–14, the first metal member 110 is held in pressed abutting contact with the abutting surface 116 of the first metal member 112 and the sealing portion 124 of the rubber layer 122. However, the first metal member 110 may be adapted to abut on the rubber layer 122. In this case, the rubber layer 122 may be formed with a plurality of annular lips 130 a indicated in FIG. 15. The annular lips 130 are formed circumferentially of the cylindrical second metal member 112, and are spaced apart from each other in the axial direction of the metal member 112.

The annular lips 130 assure improved sealing capability of the assembly 110, 112, even if the sealing portion 124 covering the relief portion 120 of the second metal member 112 is chipped, or even if some foreign matters such as dust or dirt are present between the rubber layer 122 and the mating surface of the first metal member 110.

While the first and second metal members 110 and 112 are used as the retainer member (51) and inner metal sleeve (18) in the strut bar cushion which is a modification of the cushion 16 of the first embodiment, the sealing arrangements of FIGS. 11–15 may be used for various assemblies of a first and a second metal member. Further, the configurations of the first an second metal members may be modified as desired, depending upon the application of the assembly.

In the illustrated sealing arrangements, the rubber layer 122 is provided on only one of the opposite surfaces (on only the inner circuferential surface, for example), such a rubber layer may be provided also on the other of the opposite surfaces. Although FIGS. 11–15 show only the sealing portion 124 formed on one of the opposite axial ends of the second metal member 112, a similar sealing portion may be provided on other axial end.

Further, the configuration of the sealing portion 124 is not limited to the illustrated shape. That is the sealing portion 124 may be formed with a protrusion other than the rounded top.

It is to be understood that the dimensions of the relief portions 120, 126 and 128 of the specimens used in the experiment are not limited to those indicated above, but may be suitably altered. For general applications, the radius of curvature of the rounded relief portion 120 may be suitably selected within a range of about 0.5–2.0 mm. The dimensions of the chamferred relief portion 126 and the rectangular cutout relief portion 128 may be selected within a range of about 0.5–2.0 mm. Similarly, the radius of curvature of the rounded top or protrusion of the sealing portion 124 of the rubber layer 122 may be suitably selected within a range of about 0.3–2.0 mm.

While the present invention has been described in its preferred embodiments, it is to be understood that the invention is by no means confined to the precise details of the illustrated embodiments, but the invention may be embodied with various changes, modifications and improvements, which may occur to those skilled in the art, without departing from the spirit and scope of the invention defined in the following claims.

What is claimed is:

1. A fluid-filled cushioning device connected to two support members for damping vibrations applied therebetween, comprising:

an inner sleeve through which one of said two support members is inserted for attachment to the inner sleeve;

a cylindrical elastic body mounted on an axially intermediate portion of said inner sleeve, said elastic body being provided at its outer circumferential portion with orifice-defining means which has an orifice formed therethrough;

a pair of annular elastic members each having an integrally formed inner retainer member and an integrally formed outer sleeve which are spaced apart from each other in an axial direction of the elastic members, said pair of annular elastic members being mounted on said inner sleeve such that said inner retainer member is press-fitted in a corresponding one of axial end portions of said inner sleeve while said orifice defining means of said cylindrical elastic body is sandwiched by and between corresponding axial end faces of said outer sleeves of said pair of annular elastic members, in said axial direction of the elastic members;

a cylindrical bracket which is mounted on outer circumferential surfaces of said outer sleeves of said pair of annular elastic members and to which the other of said two support members is fixed, said bracket forcing said outer sleeves of said pair of elastic members against each other via said orifice-defining means in said axial direction of the elastic members, said inner sleeve, said cylindrical elastic body and said annular elastic members cooperating with each other to define two fluid chambers which are separated from each other by said elastic body and which communicate with each other through said orifice, said fluid chambers being filled with a non-compressible fluid; and an axial dimension of said each annular elastic member before mounted on said inner sleeve being determined to permit said each annular elastic member to be axially compressed upon mounting of said pair of annular elastic members on said inner sleeve, so that said outer sleeves are urged against said orifice-defining means with a force sufficient to maintain fluid tightness between said pair of annular elastic members and said orifice-defining means, whereby the mounting of said cylindrical bracket on said outer sleeves of the elastic members may be effected in a condition that said two fluid chambers are filled with said non-compressible fluid; and wherein said inner sleeve and said cylindrical elastic body having said orifice-defining means constitute a first intermediate component prepared in the process of manufacture of said device, while said pair of annular elastic members are prepared as second intermediate components which are mounted on said inner sleeve of said first intermediate component, within a mass of said non-compressible fluid, said cylindrical bracket being mounted on said outer sleeves of said second intermediate components after an assembly of said first and second intermediate components is removed from said mass of the non-compressible fluid.

2. A fluid-filled cushioning device according to claim 1, wherein said one of said two support members which is inserted through said inner sleeve consists of a strut bar of a suspension system of a motor vehicle, while said other of said two support members which is attached to said cylindrical bracket consists of a body of the vehicle.

3. A fluid-filled cushioning device according to claim 1, wherein said each annular elastic member includes an annular rubber wall which connects said inner retainer member and said outer sleeve so that said outer sleeves of said pair of annular elastic members are urged against said orifice-defining means by axial elastic deformation of the annular rubber walls of the elastic members.

4. A fluid-filled cushioning device according to claim 1, wherein said orifice-defining means comprises a first orifice-defining metal member secured to said outer circumferential portion of said cylindrical elastic body, and a second orifice-defining metal member which is aligned with said first orifice-defining metal member such that said first and second orifice-defining metal members cooperate with each other to define said orifice.

5. A fluid-filled cushioning device according to claim 4, wherein said first orifice-defining metal member has a U-shaped portion defining an annular groove, and said second orifice-defining metal member has an annular portion which closes said annular groove so as to define an annular passage between said U-shaped portion and said annular portion, said U-shaped portion having a through hole communicating with said annular passage and one of said two fluid chambers, while said annular portion having a cutout which communicates with said annular passage and the other of said two fluid chambers, said annular passage, said through hole and said cutout cooperating with each other to define said orifice.

6. A fluid-filled cushioning device according to claim 1, wherein said cylindrical elastic body includes a partition rubber member which has a thin-walled rubber layer covering an outer circumferential surface of said inner sleeve, and further has a partition wall portion which extends radially outwardly from an axially intermediate portion of said rubber layer, said rubber layer having a sealing portion which covers an outer edge part of at least one of opposite axial end faces of said inner sleeve, said retainer member being fitted in said corresponding one of said axial end portions of said inner sleeve such that said retainer member is held in pressed abutting contact with said sealing portion of said rubber layer.

7. A fluid-filled cushioning device according to claim 6, wherein said thin-walled rubber layer has at least one annular lip formed axially inwardly of said sealing portion.

8. A fluid-filled cushioning device according to claim 6, wherein said outer edge part of said at least one end face provides a relief portion which is covered by said sealing portion of said rubber layer, said retainer member having a cylindrical wall portion fitted in said corresponding one of said opposite axial end portions of said inner sleeve, and an abutting surface which is held in contact with said end face and said sealing portion of said rubber layer such that a clearance defined by said abutting surface and said relief portion is filled by said sealing portion.

9. A fluid-filled cushioning device according to claim 8, wherein said relief portion consists of a rounded outer edge of said end face.

10. A fluid-filled cushioning device according to claim 8, wherein said relief portion consists of a chamferred outer edge of said end face.

11. A fluid-filled cushioning device according to claim 8, wherein said relief portion consists of said outer edge part whose edge is removed so as to form a rectangular cutout.

* * * * *